March 13, 1973  H. FRISHOF  3,719,984

MAKING AN ARTIC THREAD PROTECTOR

Filed Dec. 22, 1971  2 Sheets-Sheet 1

March 13, 1973   H. FRISHOF   3,719,984
MAKING AN ARTIC THREAD PROTECTOR
Filed Dec. 22, 1971   2 Sheets-Sheet 2

United States Patent Office 3,719,984
Patented Mar. 13, 1973

3,719,984
MAKING AN ARCTIC THREAD PROTECTOR
Henry Frishof, Dubois, Pa., assignor to Alco Standard
Corporation, Valley Forge, Pa.
Filed Dec. 22, 1971, Ser. No. 210,825
Int. Cl. B23k 31/02
U.S. Cl. 29—482
11 Claims

ABSTRACT OF THE DISCLOSURE

A metal sleeve or collarlike protector for end portions of pipe members has been provided having a fully closed-off forward wall construction. The procedure involves a separate deep-draw forming and shaping of an outer threaded mounting part and of an inner closing-off cup-like part. The two parts are held in an aligned relation with their forward convexly curved rim flanges in engagement and with their side skirt walls in a radially spaced relation, while a continuous weld bead is applied to the joint at the flanges to provide a unitary dual wall unit. The protector unit is only open at its back end to receive and seal-off the open end of a pipe or casing member.

BACKGROUND OF THE INVENTION

Field of the invention

This invention relates to procedure for making an improved form of threaded pipe protector that is suitable for utilization in areas that are normally subjected to freezing temperatures and especially to subzero or extremely frigid temperature conditions encountered in the Arctic and particularly to deep drawing procedure for making a dual wall forwardly closed-off thread protector collar or unit. A phase of the invention deals with solving the problem of making a thread protector that will be practical for arctic utilization and that will obviate adverse features of conventional protectors where used in arctic regions.

Description of the prior art

Previous to the present invention, thread protectors have been generally of a single wall, collar or sleeve type, provided with internal threads for cooperating with a threaded end of a pipe member and with an in-turned front flange to protect the forward edge of the pipe or casing member on which it is mounted as well as the threading thereof. In either this type of protector having a fully open front end or one having a planar front end wall with punched out openings therein to receive a pipe handling means, such as a cable hook, dirt, moisture, etc. is free to enter between the protector and the pipe member on which it is mounted. In relatively recent years, discoveries of gas and oil have been made in relatively remote arctic regions and a conventional type of single wall protector has been found to be totally unsatisfactory. That is, whether the protector has an open end or has a closed end through which holes are punched for receiving the hook of a handling crane, snow and moisture, such as prevalent in the frigid zones, will enter between the outer surface portions of the threaded pipe member and the inner surface portions of the collarlike thread protector.

Such entry at subzero temperatures of, for example, down to —67° or more produces a frozen joint that, in effect, permanently locks the thread protector on the end of the pipe member such that it cannot be removed without damage to the pipe member. Further, there is some tendency for ice which expands between the thread protector and the pipe member to damage the end of the pipe member. There has thus been a need for a practical form of thread protector of a dual wall type that will be practical for utilization in arctic regions. However, it has been determined that such a type of protector could not economically be made from a single piece of material by conventional forming procedure.

SUMMARY OF THE INVENTION

It has thus been an object of the invention to solve the problem presented, particularly from the standpoint of making a threaded pipe protector that will be practical for arctic utilization, that will have sufficient strength for such a utilization, that will meet the problem presented, and that will protect both a pipe end portion and its threads.

Another object of the invention has been to devise new and improved procedure for making a thread protector.

Another object of the invention has been to develop step-by-step procedure for utilizing deep drawing operations for making a dual-wall, closed-end thread protector of metal construction.

A further object of the invention has been to eliminate difficulties involved in attempting to form a practical type of thread protector for arctic utilization, employing a two-part procedure.

These and other objects of the invention will appear to those skilled in the art from the illustrated embodiment and the claims.

DESCRIPTION OF THE PREFERRED EMBODIMENT

Figure 10:
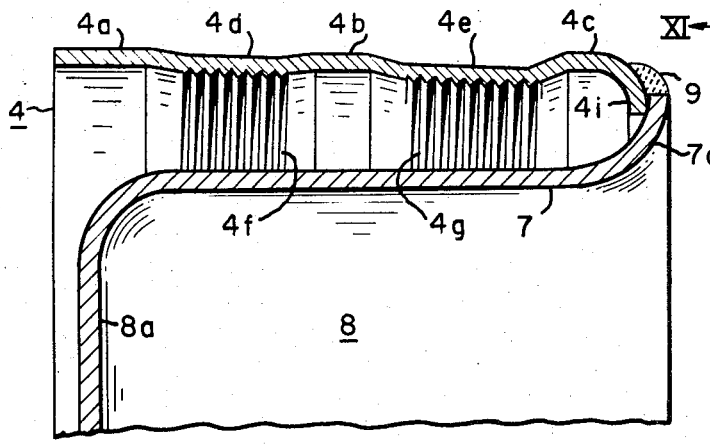
FIG. 10 is an enlarged fragmental side section in elevation through a completed thread protector unit.
Figure 11:
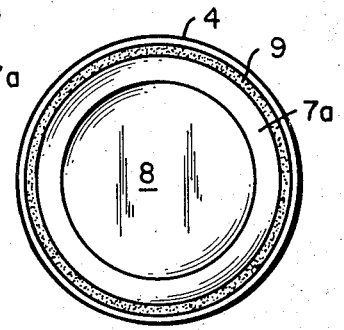
FIG. 11 is a reduced end view of the unit of FIG. 10 taken in the direction of the arrows XI—XI of FIG. 10.

In carrying out the invention, a dual-wall, deep-drawn thread protector unit 8 of suitable metal such as steel is provided which fully meets requirements for utilization in extremely low temperature or arctic regions. As also shown in FIGS. 10 and 11, the unit 8, although integral, is made up of an outer, protective sleeve wall part 4 and of an inner protective and closing-off, cup-shaped part 7 that are secured together to define a backwardly open, substantially cylindrical, pipe end receiving chamber or spacing defined between their backwardly extending skirt wall portions. The outer or collar part 4 is internally threaded for removable and on and off mounting with respect to an externally threaded pipe member, such as 70 of FIG. 12, and is fully closed-off at its forward end by the unitized construction that utilizes overlapping front end, convexly turned, cooperating, rim flanges of the inner cup-shaped part 7 and the outer sleevelike part 4. The two parts 4 and 7 are unitized by a continuous weld bead 9 along their front edge portions to define a closed-off front edge wall and an inwardly or backwardly offset back wall 8a that is fully closed-off and backwardly offset to receive a lifting or handling hook or other grappling means 66 (see FIG. 12) for the pipe member 70 on which it is mounted.

Figure 1:
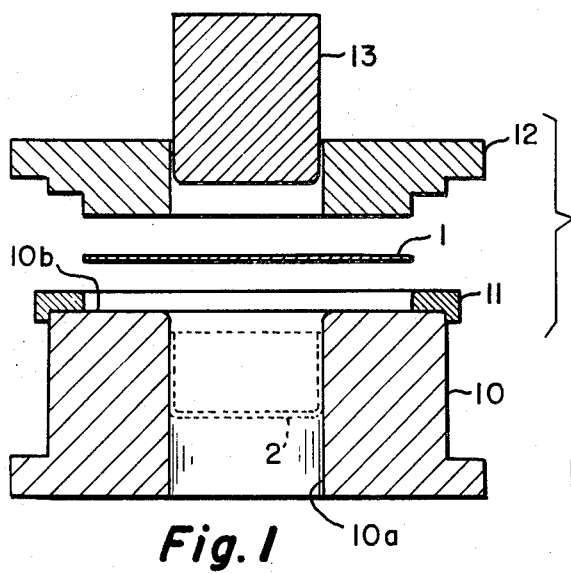
FIG. 1 is a sectional elevation through apparatus employing the invention that illustrates somewhat diagrammatically a first or preliminary positioning of an assembly of deep drawing parts for forming a flat, disclike blank or workpiece of a suitable metal such as somewhat flexible steel into a preliminary cup shape.
Figure 2:
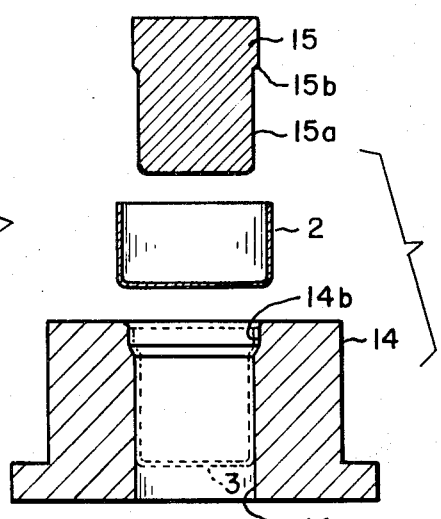
FIG. 2 is a view on the scale of and similar to FIG. 1 illustrating a second step in the procedure of forming one part of a thread protector unit which involves deep drawing to simultaneously reduce the diameter of and elongate a cup-shaped workpiece formed in accordance with the procedure and apparatus of FIG. 1.

In forming of the outer part 4, the steps illustrated in FIGS. 1 to 5 utilize suitable apparatus such as therein illustrated. In FIG. 1, a disclike flat or planar piece of metal 1 forms a blank or workpiece which is laid on a top face 10b of a draw die 10 and within a draw ring or gauge 11 that is positioned thereon. The blank or workpiece 1 is then formed by lowering a blank holder 12 into abutment with its upper face and into cooperative engagement with an upper face 10b of the die 10 and within the ring 11. The workpiece 1 is thus securely held in position while a punch 13 is advanced into a central bore 10a of the die 10 to deep-draw-form a preliminary cup shape 2. In the next step illustrated in FIG. 2, the preliminary shape 2 is advanced into an upper, filleted and enlarged bore portion 14b of a draw die 14 by a draw punch 15 and within a central bore 14a of the die 14, until an offset shoulder 15b of an advancing slightly smaller diameter, front operating end portion 15a of punch 15 has moved substantially fully down into the bore 14a and until the shoulder 15b has engaged a filleted shoulder 14b of the die. This results in a reduction of the diameter of the cup-shaped preliminary shape or form 2 and an elongation of its side skirt wall to produce the intermediate shape 3 shown in FIGS. 2 and 3. The shape 3 has an enlarged mouth or flange portion 3a produced by the filleted portion 14b of the die 14.

Figure 3:
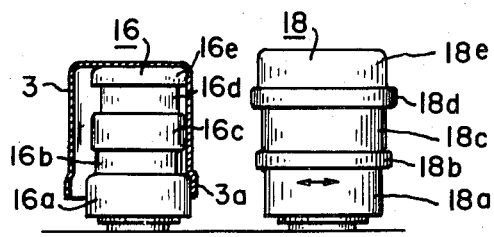
FIG. 3 is a vertical view in elevation and partial section showing a roll assembly on the scale of FIGS. 1 and 2 that is utilized in a third step of the procedure for forming one part of a protector unit which involves rolling-in reduced diameter banding portions while simultaneously forming outwardly projecting intermediate banding portions in the skirt wall of the workpiece shape that has been drawn utilizing the procedure and apparatus of FIG. 2.

In the third step as represented in FIG. 3, the preliminary form or shape 3 is placed in position over a primary ribbed extending roll 16. As shown, the roll 16 has a group of spaced-apart, outwardly projecting, annular, banding wall or rib portions 16a, 16c and 16e and connecting or intermediately positioned, reduced diameter, cylindrical or annular banding wall portions 16b and 16d. A secondary cooperating roll 18 is provided having reduced annular or banding portions 18a, 18c and 18e which correspond to the enlarged portions 16a, 16c and 16e of the primary roll 16. The secondary roll 18 also has enlarged or extending annular banding portions 18b and 18d between and connecting the reduced banding portions 18a, 18c and 18e. The projecting banding portions 18b and 18d are adapted to fit within the recessed banding portions 16b and 16d of the roll 16.

Figure 4:
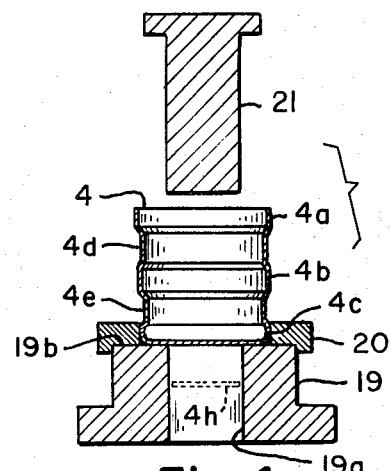
FIG. 4 is a somewhat diagrammatic sectional view in elevation on the scale of FIGS. 1 to 3 illustrating a fourth step in the forming of an outer part of a thread protector unit which involves punching-out a front end wall of the workpiece and forming a convexly curved, in-turned, front end rim flange therefor.

The roll 18 is adapted to be moved into and out of a pass-defining relation with the roll 16 that involves a complementary interfitting of their respectively banding portions. Relative rotation therebetween will produce banding portions within the wall of the form 3, such as particularly illustrated in FIG. 4. In FIG. 4, the shape produced by the operation of FIG. 3 is designated as form 4 and as having outwardly offset, annular, banding portions 4a, 4b and 4c and inwardly offset, rolled-in or recessed annular banding portions 4d and 4e. In the operation illustrated in FIG. 4, the closed end of the part 4 is positioned on an upper end wall 19b of a piercing die 19 by a draw ring 20, and punch 21 is lowered to knock-out an end wall disc portion 4h into a central bore 19a of the die 19 and produce a final shape of the first part which has been designated 4 and which, as shown in FIG. 5A, has a convex, in-turned forward end rim flange 4i that is to be later utilized in aligning with a coperating out-turned rim flange 7a of the inner part 7 to form a dual end wall, as connected by the continuous weld bead 9.

Figure 5:
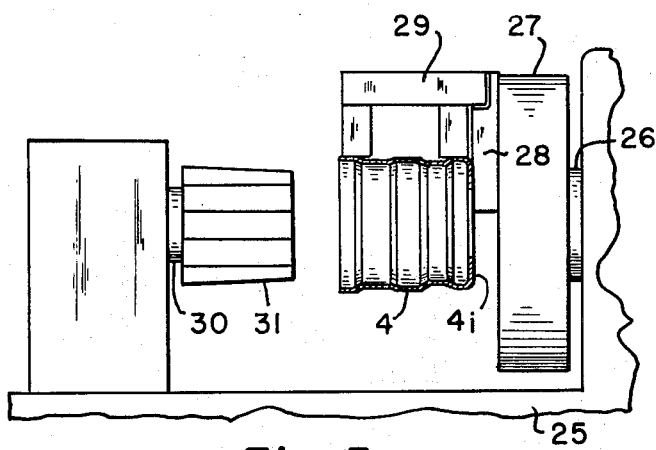
FIG. 5 is a somewhat diagrammatic sectional view in elevation on the same scale of a lathe utilized for supporting the workpiece and in machine-forming internal threads along its recessed banding wall portions, utilizing the shape produced by the operations of FIGS. 3 and 4.
Figure 5A:
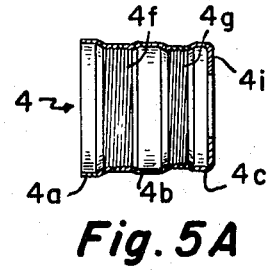
FIG. 5A is a side sectional view in elevation on the scale of FIGS. 1 to 5 showing a completed outer part that has been produced utilizing the deep drawing operations and step-by-step procedure of FIGS. 1 to 5, inclusive.
Figure 6:
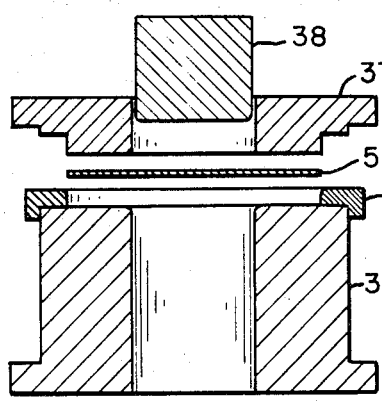
FIG. 6 is a somewhat diagrammatic sectional view in elevation on the scale of FIGS. 1 to 5A, inclusive, illustrating apparatus for effecting a preliminary deep drawing operation on a second disc-like metal workpiece or blank that is to be utilized in making an inner or cuplike part of a complete thread protector unit.

FIG. 5 somewhat diagrammatically illustrates a lathe 25 utilized for machine-forming threads 4f and 4g on the inwardly offset or recessed banding portions 4d and 4e of the part 4. In FIG. 5, the apparatus shown for the purpose of illustrating the thread forming procedure involves a chuck supporting shaft 26, a chuck 27, a positioning head 28 on the chuck and chuck jaws 29 for carrying the workpiece 4. An opposed head of lathe 25 has a shaft 30 that carries a tapping head 31 that is adapted to be moved or inserted within the part 4 and rotate therewithin to form the threads 4f and 4g (shown particularly in FIG. 5A).

Figure 7:
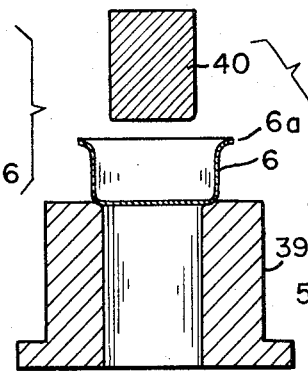
FIG. 7 is a view similar to FIG. 6 illustrating apparatus for and the step of further deep-draw forming the preliminarily formed shape or workpiece of FIG. 6 into an elongated substantially finished part.

In FIGS. 6 to 9, inclusive, step-by-step procedure and suitable apparatus assemblies are illustrated for forming the inner or cup-shaped part 7 of the thread protector unit 8. Such part as completed in its separate forming is shown in FIG. 8A. In the first step, a second disclike flat metal piece 5 of a suitable metal material such as steel is placed on the upper face of a draw die 35 within a draw ring or guide 36 and is clamped in position by a blank holder 37 while a deep drawing punch 38 is moved downwardly into the bore of the die 35. This produces a preliminary bowl-like cup shape 6, such as illustrated in FIG. 7, which has a convexly outwardly projecting front edge flange or rim 6a. In FIG. 7, a draw die 39 and a punch 40 are utilized in a deep drawing operation to reduce the diameter of the skirt wall of the workpiece 6 and elongate it to the shape of FIG. 8.

Figure 8:
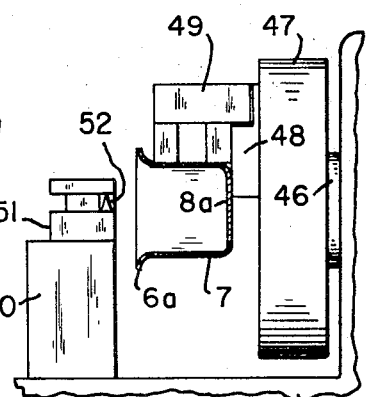
FIG. 8 is a somewhat diagrammatic side view in elevation on the scale of FIGS. 6 and 7 illustrating a final step in forming the second part of the protector construction and particularly showing a lathe used for trimming an outwardly projecting front flange of the form of workpiece produced in accordance with the step of FIG. 7.
Figure 8A:
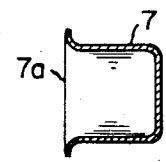
FIG. 8A is a side section in elevation on the scale of FIGS. 1 to 8, inclusive, showing a completed inner or second part of the construction after the trimming operation of FIG. 8 has been completed.

In FIG. 8, a fourth step is accomplished on the shape 7 by utilizing a lathe 45 which at one end has a chuck support shaft 46, a chuck 47, a workpiece mount 48 and chuck jaws 49. At its other end, a head 50 carries a mount 51 on which a trimming tool 52 is secured. The head 50 is movable along the bed of the lathe 45 and the tool 52 is upwardly expandable on the mount 51 to engage the flange 6a adjacent its outer end to cut-off edge surplusage therefrom and produce the final shortened, outwardly projecting flange 7a of FIG. 8A. It will be appreciated that the cut-off can be effected by any other suitable means. For example, a trimming die may be employed with the flange 6a to be trimmed resting on the edges of the bore of a die block in such a manner that a downstroke of a plunger will accomplish the cut-off.

Figure 9:
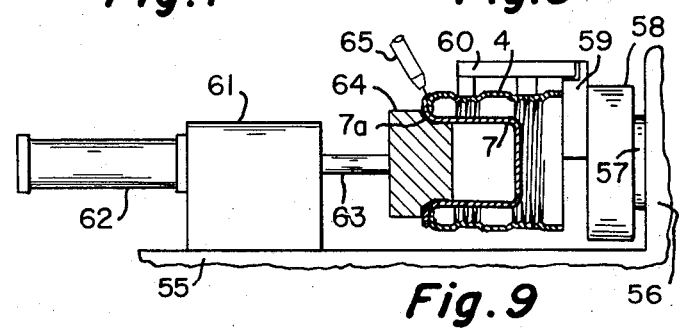
FIG. 9 is a side view in elevation and partial section showing the utilization of a lathelike apparatus or jig for positioning the two parts of the construction as a cooperating, aligned, dual-wall assembly, and unitizing the parts by a continuous edge-welding of their cooperating and abutting rim flanges to form a smooth closing-off bead or fillet along the joint edges therebetween.

In FIG. 9, outer part 4 and inner part 7 are positioned on a lathe or jig 55 in a secure aligned relation between cooperating opposed head parts. In this connection, a shaft 57 extends from head 56 and carries a chuck 58 which has a workpiece mounting abutment 59 and chuck jaws 60 to engage and position the outer part 4 in forward alignment. An opposed, longitudinally movable head 61 carries a fluid motor 62 and a piston rod 63. The rod 63 at its forward end has a guiding head portion 64 of cylindrical, pistonlike shape which is adapted to be advanced into a secure positioning relationship with the forward end of the inner part 7 to hold its outwardly bent, convexly curved, forward rim flange 7a in tight, overlapping, abutting engagement with the inwardly curved, convex rim flange 4i of the outer part 4. A continuous weld bead 9 is effected by an oxyacetylene torch or an electrode 65. The torch or electrode 65 may be either rotated about the two parts 4 and 7 or the two parts rotated on the lathe 55 while the torch or electrode 65 is maintained in a stationary relation to thus form a smooth end flange securing, outwardly convex, continuous or annular weld bead 9 (see FIG. 10). The bead 9 extends as an outwardly, convexly, rounded, space-closing-off forward end or edge portion on and along the outer edge of the flange 7a, over the joint, and on and along the convex front side of flange 4i. It is essential that the weld bead 9 provide a smooth rounded shoulder to close-off any cavity or space between the flange portions 4i and 7a within which moisture might collect and freeze.

The outer part 4 of the finalized, unitary thread protector unit 8 may be of the general thread construction of U.S. Pat. No. 2,893,438 to facilitate rotating the unit on and off of the threaded end of a pipe member 70.

It is essential in carrying out the invention to provide an element or unit 8 that will have a close fitting assembly over the mouth end of a pipe member 70 such that moisture will be excluded. Also, it should be of a construction or shape that will permit the use of pipe handling hooks or clamps or the like, such as 66, without the necessity of piercing the protector unit. In this way, a pipe member 70 can be lifted by hoist cables 67 and transported by using a pair of hooks, grapples or clamps 66. The hooks 66 may be inserted in opposite ends of a pipe member 70, in a manner similar to FIG. 12, in engagement with the dual end wall of each associated thread protector 8. It will be noted that cross-extending, inwardly disposed, closing-off, back end wall 8a of the completed unit 8 and the outwardly convex or rounded edge, nose or end wall enabled by the weld bead 9, provide a protector 8 that is fully closed-off and convexly rounded forwardly of the pipe member 70 on which it is mounted. The endwise spaced-apart thread areas 4f and 4g on the inwardly projecting wall bands 4d and 4e, a backward-outward flare or taper of the skirt wall of the outer collarlike part 4, the provision of clearance defining female threaded portions at the areas 4f and 4g, the inwardly spaced or clearance-defining position of the skirt wall of the inner part 7 with respect to the pipe member 70 (see FIG. 10), and a somewhat flexible dual steel wall construction of the unit 8, all assure a relatively easy on and off mounting of the dual skirt wall protector 8 in a sealing-off relation with respect to the threaded end wall portion of the pipe member.

Figure 12:
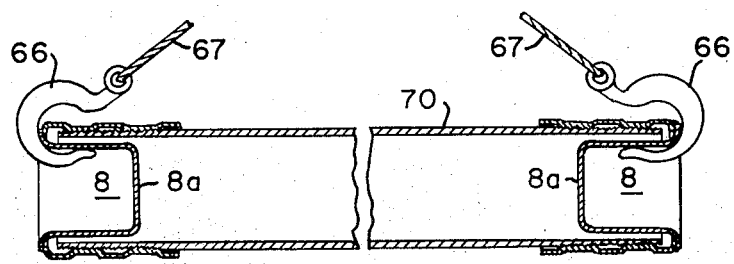
FIG. 12 is a somewhat diagrammatic, broken-away side sectional view in elevation on the scale of such representative figure as 9 through a pipe or casing member showing both ends thereof having thread protectors thereon of a construction formed in accordance with procedure of the invention. This view somewhat diagrammatically illustrates how a hoist or crane hook used for manipulating pipe members may engage within the thread protector without any need to pierce it.

Although the assembly of FIG. 12 is illustrative of the use of threaded pipe protectors 8 as applied to both ends of a pipe member 70, a threaded protector 8 may be applied to only one threaded end of a pipe member, with an internally threaded coupling collar being mounted on the other threaded end to extend therefrom ready for assembling with another pipe member. In such event, the outer end of the coupling collar which constitutes an extension of the one end of the pipe member, may be protected by an end protector having a radially outwardly offset portion provided with male threads adapted to engage inside or female threads of the coupling collar.

Depending on the size of pipe for which the threaded protector 8 is to be made, the operations may be simplified to the extent of forming each part by a single drawing operation. The invention is applicable to the forming of a double wall threaded protector device.

For the deep drawing operations of the invention, the cup-shaped part 7 should be substantially cylindrical and the offset formed thereby (see FIGS. 10 and 12) will be deep enough to receive the handling hook or other gripping means 66 and to permit double contact point engagement therewith. By way of example, the offset may be 3½ inches deep. The cylindrical shape assures the same type of lifting stress for both ends and for any position of a pipe member with the threaded protectors on its ends. The dual wall construction provided by the process herein set forth is easy to grip and screw on and off with a standard pipe wrench by inserting one jaw into the recess and the other jaw on the outside of the outer or collar part 4, with the handle of the wrench extending outwardly perpendicularly or transversely to the longitudinal axis of the pipe member 70. This eliminates the need for lugs or other obstructions. It is important to note that the dual-wall, threaded pipe connector 8 produced in accordance with the procedure of the invention will protect both the threads as well as the end of the pipe member 70 on which it is mounted.

I claim:

1. A method of making a dual-wall thread protector for the threaded end of a pipe member that is particularly suitable for use in a frigid zone which comprises, providing a first flat disclike metal blank, deep-drawing the first blank and forming it into an elongated cylindrical shape having a closed-off back end wall and an open front end, punching-out the closed-off end wall of the shape and providing it with an inwardly curved rim flange thereabout, and completing the forming of a first part of the protector; providing a second disclike metal blank and deep-drawing it into an endwise-elongated cylindrical shape of reduced diameter having a closed-off back end wall and an open front end, forming an outwardly curved rim flange about the open front end of the elongated shape and thus completing a second part of the protector; forming threads along the skirt wall of one of the parts; assembling the two shaped parts with the second part positioned within the first part, with the rim flange of one part in engagement with the rim flange of the other part, and with the skirt wall of the second part extending in an inwardly spaced-apart relation along and within the skirt wall of the first part to define a backwardly open pipe-end-receiving chamber therewith, and maintaining the two parts in the defined position relation while applying a continuous weld bead along the engaging rim flange portions of the two parts and forming a rounded front nose therealong to provide a unitized structure having its two parts in the previously defined mounted relation with respect to each other.

2. A method as defined in claim 1 wherein, spaced-apart radially inwardly and outwardly projecting groups of longitudinally spaced-apart annular bands are formed about the skirt wall of the deep-drawn elongated first part, and the threading is formed internally only along the group of bands that project radially inwardly of the skirt wall.

3. A method as defined in claim 2 wherein, in the second deep-drawing step imparted to the first blank, an enlarged rim flange is formed about its open end portion while its back end wall is retained in a closed-off relation with its skirt wall.

4. A method as defined in claim 2 wherein, a pair of spaced-apart recessed wall bands are roll-formed in the skirt wall of the first part, and relatively coarse threads are formed along inner wall portions of the pair of recessed wall bands of the first part that are adapted to engage with external threads on the end of the pipe member on which the protector is to be mounted.

5. A method as defined in claim 1 wherein, the rim flanges of the two parts are welded together in overlapping abutment with an outwardly convex weld bead.

6. A method as defined in claim 1 which comprises, progressively applying the weld bead while relatively rotating the assembled two parts.

7. A method of making a dual-wall thread protector that is particularly suitable for use in a frigid zone which comprises, providing a first flat disclike metal blank, deep-drawing the first blank in a die and forming it into a preliminary substantially cylindrical cup-shape having a closed-off back end wall, thereafter deep-drawing the preliminary cup-shape in a die and retaining its closed-off end wall while forming it into an elongated cylindrical shape of reduced diameter, forming annular bands about the wall of the elongated shape, punching-out the closed-off end wall of the shape and providing it with an inwardly projecting rim flange thereabout, internally forming threads along the annular bands and thus completing a first part of the construction; providing a second disc-like metal blank and deep-drawing it into an open bowl-like shape, further deep-drawing the bowl-like shape into an endwise-elongated cylindrical shape of reduced diameter, forming an outwardly curved rim flange about the open mouth end of the elongated shape and thus completing a second part of the construction; assembling the two shaped parts with the second part positioned within the first part, with the rim flange of one part in engagement with the rim flange of the other part, and with the skirt wall of the second part extending in a spaced-apart relation along and within the skirt wall of the first part to define a backwardly open pipe-end-receiving chamber therewith, and maintaining the two parts in the defined positioned relation while applying a continuous weld bead along the engaging rim flanges of the two parts to provide a rounded front edge bead therealong and a unitized structure having its two parts in the defined assembled relation with respect to each other.

8. A method as defined in claim 7 wherein, the two shaped parts are positioned with the rim flange of one part in overlapping engagement with the rim flange of the other part, and the weld bead is applied to extend continuously along and convexly backwardly across the joint between the rim flanges of the two parts.

9. A method as defined in claim 7 wherein, the two parts are positioned with the rim flange of the second part in overlapping engagement with the rim flange of the first part, and the weld bead is applied to define a continuous annular nose bead of outwardly convex shape along the outer lip edge of the second part, across the joint between the parts, and along an outer face of the rim flange of the first part.

10. A method as defined in claim 7 wherein, the rim flange of the first part is formed by the second deep-drawing operation and the punching-out of the closed-off end wall thereof, and the rim flange of the second part is substantially formed by the first deep-drawing operation thereon.

11. A method as defined in claim 10 wherein, the rim flange of the second part is finished after the second drawing operation thereon by trimming-off of an extreme outer portion thereof.

References Cited

UNITED STATES PATENTS

| | | | |
|---|---|---|---|
| 2,204,130 | 6/1940 | Engstrom | 138—96 T |
| 2,745,438 | 5/1956 | Bloom | 138—96 T |
| 2,893,438 | 7/1959 | Rickard | 138—96 R |
| 3,129,505 | 4/1964 | Cox | 29—475 X |

J. SPENCER OVERHOLSER, Primary Examiner

R. B. LAZARUS, Assistant Examiner

U.S. Cl. X.R.

29—475; 138—96